(12) United States Patent
Bucur

(10) Patent No.: US 7,339,323 B2
(45) Date of Patent: Mar. 4, 2008

(54) SERIAL POWERING OF AN LED STRING

(75) Inventor: Constantin Bucur, Santa Clara, CA (US)

(73) Assignee: 02Micro International Limited, Grand Cayman (KY)

( * ) Notice: Subject to any disclaimer, the term of this patent is extended or adjusted under 35 U.S.C. 154(b) by 0 days.

(21) Appl. No.: 11/282,097

(22) Filed: Nov. 16, 2005

(65) Prior Publication Data

US 2006/0244396 A1 Nov. 2, 2006

Related U.S. Application Data

(60) Provisional application No. 60/676,448, filed on Apr. 29, 2005.

(51) Int. Cl.
*H05B 37/00* (2006.01)

(52) U.S. Cl. .................... 315/128; 315/122; 315/312; 315/247; 315/185 R; 315/291; 315/219; 315/294

(58) Field of Classification Search .................. 345/46; 315/312, 185 R, 209 R
See application file for complete search history.

(56) References Cited

U.S. PATENT DOCUMENTS

2005/0243022 A1* 11/2005 Negru .................... 345/46

* cited by examiner

*Primary Examiner*—Douglas W. Owens
*Assistant Examiner*—Chuc Tran

(57) ABSTRACT

A circuit is used for driving a plurality of LEDs by an external voltage source. The LEDs are coupled in series. The circuit comprises a plurality of switches coupled to the LEDs in parallel, respectively, for individually controlling the brightness of the LEDs. The circuit further includes a plurality of Pulse-Width Modulation (PWM) signals coupled to the switches, respectively, for individually controlling the switches.

10 Claims, 3 Drawing Sheets

SERIAL POWERING OF AN LED STRING

CROSS REFERENCE TO PROVISIONAL APPLICATION

This application claims priority to the co-pending provisional patent application, Ser. No. 60/676,448, entitled "Serial Powering Of An LED String," with filing date Apr. 29, 2005, and assigned to the assignee of the present invention, which is herein incorporated by reference in its entirety.

TECHINCAL FIELD

This invention relates to a circuit for driving or powering loads, such as LEDs (Light Emitting Diodes), and more particularly to a circuit or a method for driving or powering LEDs which are coupled in series.

BACKGROUND ART

Referring to FIG. 1, a typical circuit 10 for driving or powering a plurality of LEDs in the prior art is illustrated. For example, the circuit 10 is used for driving 4 LEDs 22, 24, 26, and 28, as shown in FIG. 1. It will be appreciated that the LEDs 22, 24, 26, and 28 are coupled in parallel. An external voltage source is coupled to a driver 12 for supplying a voltage, Vcc, to the driver 12. The driver 12 has a low-dropout (LDO) regulator 14 for supplying a regulated voltage, Vreg, to the LEDs 22, 24, 26, and 28. Typically, the regulated voltage, Vreg, is 3.3 volts. The LEDs 22, 24, 26, and 28 are coupled to switches 32, 34, 36 and 38 and resistors 42, 44, 46, and 48, respectively. As shown in FIG. 1, the LEDs 22, 24, 26, and 28, the switches 32, 34, 36 and 38, and the resistors 42, 44, 46, and 48 are coupled in series, respectively.

For example, the current requirement for each one of the LEDs 22, 24, 26, and 28 is 10 mA. On the condition that the voltage, Vcc, of the external voltage source is 30 V, the power requirement for the LEDs 22, 24, 26, and 28 is Pw, where Pw is calculated as follows: Pw=30V×4×10 mA=1.2 W.

In a practice use, the circuit 10 may be installed in a portable device, such as a cellular phone, a digital camera, a laptop computer, electrical vehicle or portable power tool. As shown in Prior Art FIG. 1, a single high voltage integrated circuit (IC) is used, and thus only a single high voltage power supply is provided. Whether the load current is drained out of a low voltage regulator or out of a higher voltage regulator, the current flows through the IC and must dissipate a significant amount of power. This is significant from some points of view, such as, IC design, system power budget and power dissipation inside the system.

SUMMARY OF THE INVENTION

It is an object of the present invention to provide a circuit or method for driving or powering a plurality of LEDs with a low current.

In order to achieve the above object, the present invention provides a circuit for driving a plurality of LEDs by an external voltage source. The LEDs are coupled in series. The circuit comprises a plurality of switches coupled to the LEDs in parallel, respectively, for individually controlling the brightness of the LEDs. In another embodiment, the circuit comprises a plurality of Pulse-Width Modulation (PWM) signals coupled to the switches, respectively, for individually controlling the switches.

BRIEF DESCRIPTION OF THE DRAWINGS

Other objects, advantages, and novel features of the invention will become more apparent from the following detailed description when taken in conjunction with the accompanying drawings.

PRIOR ART

DESCRIPTION OF EMBODIMENTS

Reference will now be made in detail to the embodiments of the present invention, serial powering of an LED string. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
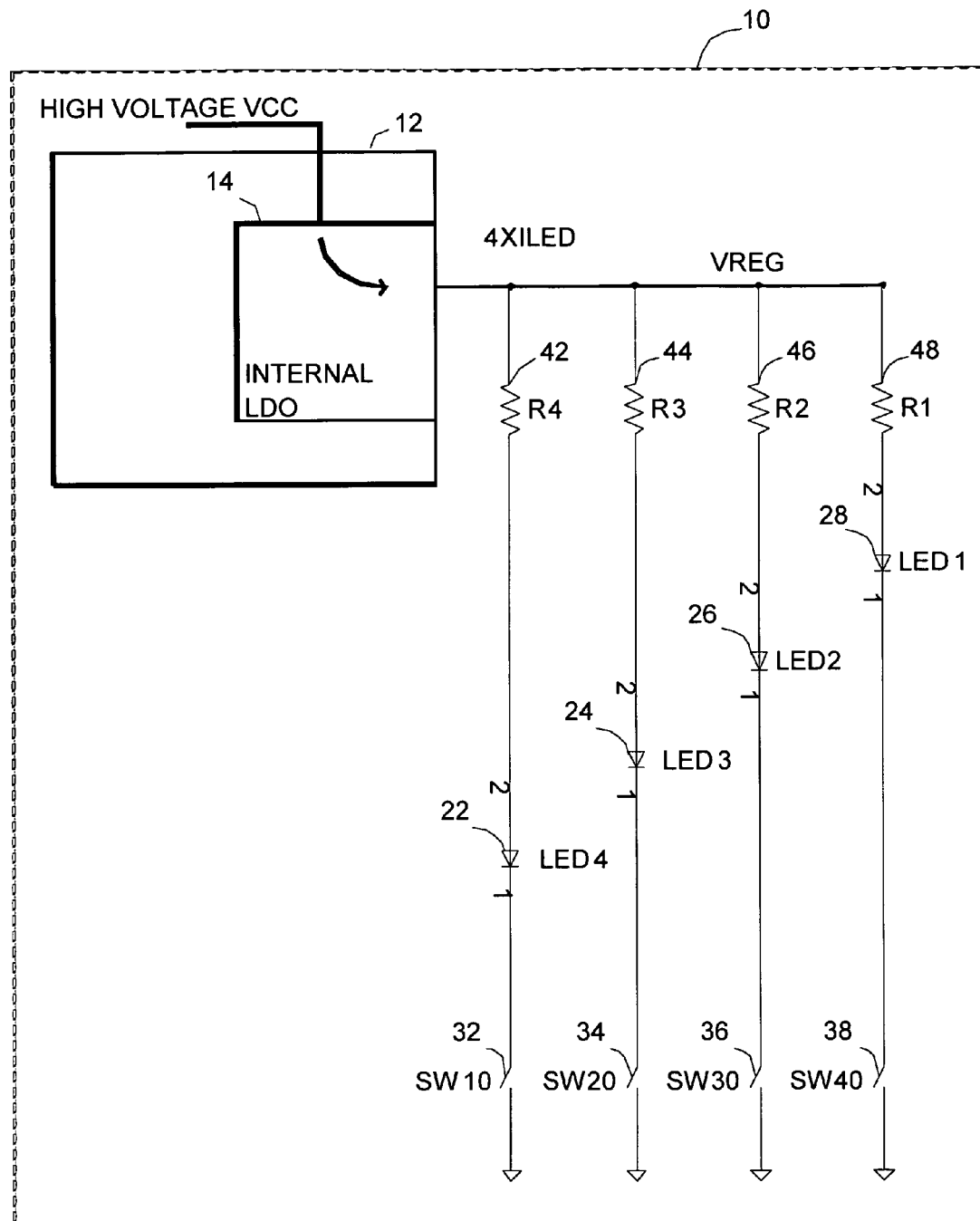
FIG. 1 is a block diagram showing a circuit for driving a plurality of LEDs in the prior art.
Figure 2:
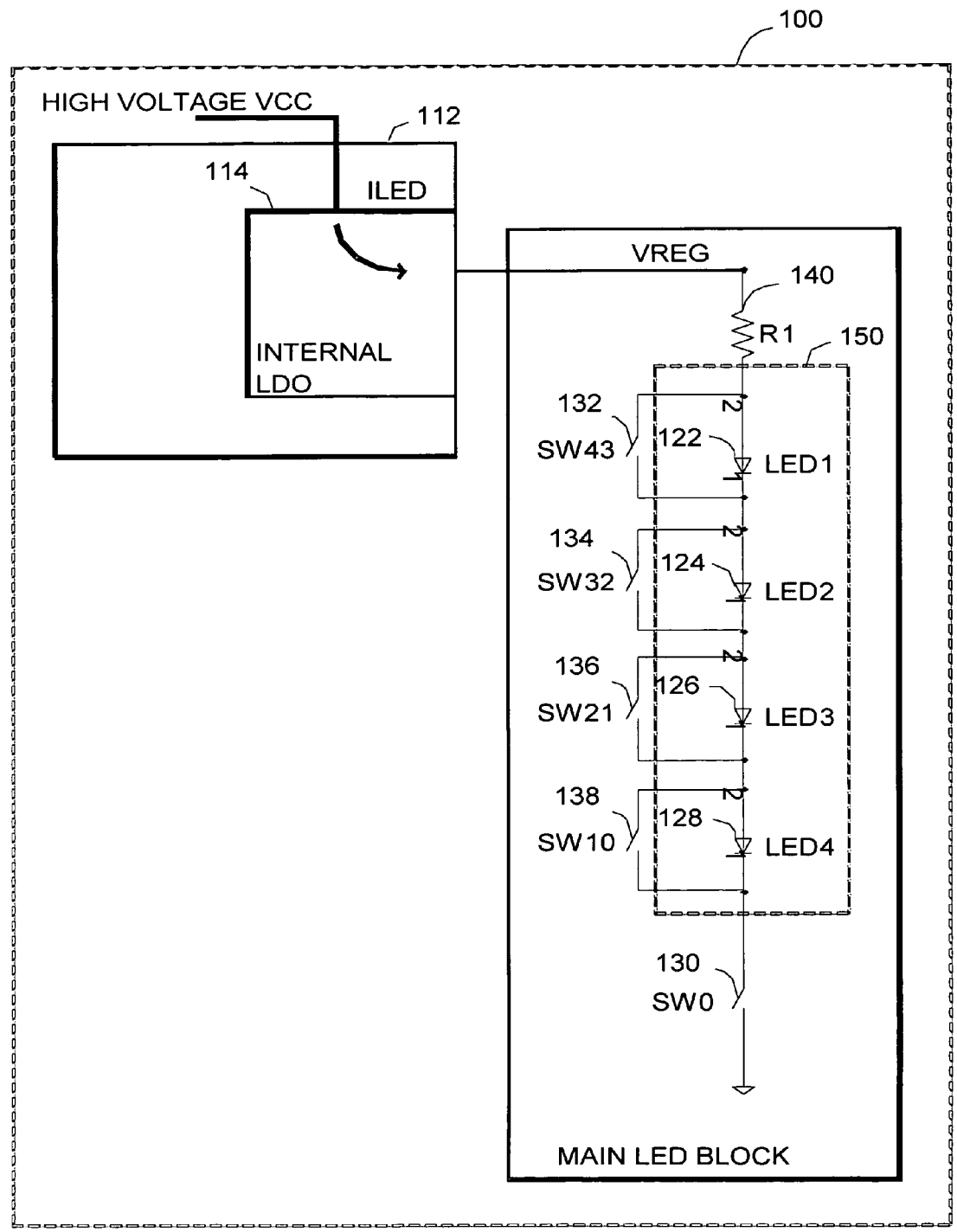
FIG. 2 is a block diagram showing a circuit for driving a plurality of LEDs according to an embodiment of the present invention.

Referring to FIG. 2, a circuit 100 for driving or powering a plurality of loads, such as LEDs, according to an embodiment of the present invention is illustrated. For example, as illustrated in FIG. 2, the circuit 100 is used for driving 4 LEDs 122, 124, 126, and 128. Other embodiments are well suited to supporting any number of loads, such as LEDs (e.g., 2, 3, 4, . . . ) Also, it will be apparent to those skilled in the art that other embodiments of the present invention support the use of other types of loads in place of the LEDs 122, 124, 126, and 128.

As shown in FIG. 2, the LEDs 122, 124, 126, and 128 are coupled with each other in series so as to form a string 150. An external voltage source is coupled to a driver 112 for supplying a voltage, Vcc, to the driver 112. The driver 112 has a linear regulator, such as a voltage follower, a shunt regulator or a low-dropout (LDO) regulator 114, for supplying a regulated voltage, Vreg, to the LEDs 122, 124, 126, and 128. It will be apparent to those skilled in the art that the voltage, Vcc, is usually higher than the regulated voltages, Vreg. It will be apparent to those skilled in the art that the external voltage source may not be regulated.

The LEDs 122, 124, 126, and 128 coupled in series are also coupled to a resistor 140 and a switch 130. A plurality of switches 132, 134, 136, and 138 are coupled to the LEDs 122, 124, 126, and 128 in parallel, respectively. That is, each of the switches is coupled in parallel with a corresponding LED. For instance, switch 132 is coupled in parallel with the LED 122. In this arrangement, the regulated voltage, Vreg, from the LDO regulator 114 of the driver 112 is supplied to the resistor 140 and the LEDs 122, 124, 126, and 128 such that all the LEDs 122, 124, 126, and 128 are turned on, in one embodiment.

The switches 132, 134, 136, and 138 coupled to the LEDs 122, 124, 126, and 128 are able to control the brightness of the individual LEDs 122, 124, 126, and 128. The switches 132, 134, 136, and 138 serve as bypass current paths for the LEDs 122, 124, 126, and 128. For example, the switch 132 serves as a bypass current path for the LED 122, the switch 134 serves as a bypass current path for the LED 124, the switch 136 serves as a bypass current path for the LED 126, and the switch 138 serves as a bypass current path for the LED 128. It will be appreciated that the LED 122 will be turned off, when the switch 132 is shorted or disabled.

In contrast, the LED 122 will be turned on, when the switch 132 is opened or enabled. Similarly, the LEDs 124, 126, and 128 are turned on and off through the use of the switches 134, 136, and 138, respectively.

Furthermore, a Pulse-Width Modulation (PWM) controlled method is incorporated, in accordance with one embodiment of the present invention. In other words, PWM signals can be applied to the switches 132, 134, 136, and 138 to individually control the brightness of the LEDs 122, 124, 126, and 128. For example, taking the LED 122, a controller, not shown, can be used to generate a PWM signal to enable or disable the switch 132 so as to control the brightness of the LED 122 or dim the LED 122. Specifically, when any one of the LEDs 122, 124, 126, and 128 is shorted or is turned off, the brightness of the rest thereof will be varied. The PWM signals can be used to control the switches for the rest of the LEDs so as to keep the brightness from varying. In addition, when the LEDs 122, 124, 126, and 128 have various colors, the switches 132, 134, 136, and 138 also can be used to eliminate the brightness difference of the LEDs 122, 124, 126, and 128.

According to an embodiment of the present invention, the current through each of the LEDs 122, 124,126, and 128 can be diverted by the switches 132, 134, 136, and 138. The diverted current through the switches ranges from 0 to a predetermined level. In one embodiment, the predetermined level can be a maximum current Id_max, as shown in Equation 1:

$$Id\_max = Vled/Ronsw \quad (1)$$

In Equation 1, Vled is the nominal voltage of each of the LEDs 122,124, 126, and 128; and Ronsw is the resistance of each of the switches 132,134,136, and 138 on the condition that the current through the resistor 140 is less than /R1, described hereinafter in detail.

In this case, the current is divided with a factor proportional to the duty cycle ratio of the PWM signal applied to the switches, in accordance with one embodiment of the present invention. For purposes of illustration, taking the LED 122 as an example, when the current at the resister 140 is Iex, the voltage of the LED 122 is V122, and the resistance of the switch 132 is R132. The current through the switch 132 is varied from 0 to Id_max=V122/R132, and the current through the LED 122 is varied from Iex to Iex−(V122/R132). If (V122/R132) is larger than or equal to Iex, the current through the LED 122 is varied from Iex to 0.

Similarly, the current through the LEDs 124, 126, and 128 can be modulated by the switch 134, 136, and 138 from Iex to 0, respectively. Accordingly, the current through the LED can be adjusted, individually, no matter how many LEDs are turned on at a given time.

Furthermore, when all the LEDs 122, 124, 126, and 128 need to be turned on, an initial current, Icc_max, is required, as shown in Equation 2:

$$Icc\_max = [Vreg - NxVled]/R1 \quad (2)$$

In Equation 2, NxVled is the sum of the voltages of the LEDs 122, 124, 126, and 128; and R1 is the resistor value of the resistor 140.

The initial current, Icc_max must be less than the maximum continuous current, which is the maximum required current through the LEDs 122, 124, 126, and 128, in accordance with one embodiment of the present invention.

Furthermore, the switch 130 is used to turn off all of the LEDs 122, 124, 126, and 128, in accordance with another embodiment of the present invention. Also, the switch 130 is used for controlling or dimming the entire string 150 of the LEDs 122, 124, 126, and 128, in another embodiment of the invention.

It is evident that the circuit 100 according to one embodiment of the present invention is able to power or drive a plurality of LEDs (e.g., LEDs 122, 124, 126, and 128), and also reduce the current by any number of LEDs which are put in series. As a result, the circuit 100 according to the embodiment of the present invention is able to significantly reduce the dissipation of power.

Figure 3:
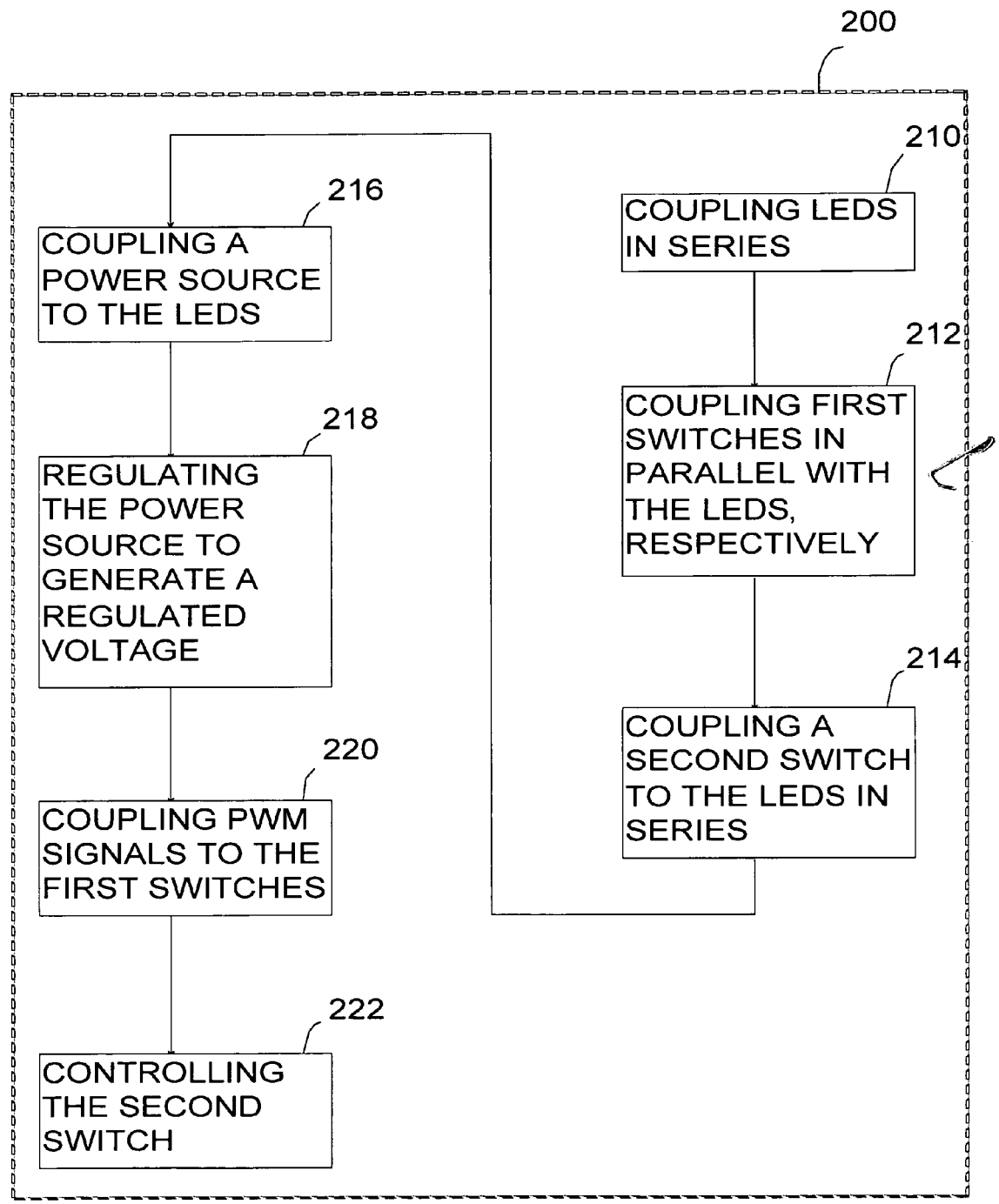
FIG. 3 is the diagram showing a method for charging a battery according to one embodiment of the present invention.

Referring to FIG. 3, a method 200 for driving light emitting diodes according to embodiments of the present invention is illustrated. At 210, each of a plurality of light emitting diodes (LEDs) is coupled in series. At 212, a plurality of first switches are coupled to the LEDs in parallel, respectively. That is, each of the plurality of LEDs is coupled in parallel to a corresponding switch in the plurality of first switches. At 214, a second switch is coupled to the LED in series. This switch controls power to the plurality of LEDs. At 216, a power source is coupled to one end of the plurality of LEDs to deliver power to the plurality of LEDs. At 218, the power source is regulated to generate a regulated voltage. The regulated voltage is coupled to one end of the LEDs for supplying power to the LEDs. At 220, a plurality of Pulse-Width Modulation (PWM) signals are respectively coupled to the plurality of first switches for individually controlling the brightness of each of the plurality of LEDs. At 222, the entire brightness of the plurality of LEDs is controlled by means of controlling the second switch. That is, when the switch is engaged power is delivered to the plurality of LEDs. Also, when the switch is disengaged, power is not delivered to the plurality of LEDs.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. For example, different type of loads can be used in place of the LEDs, or the PWM generation can be analog or digital. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for driving light emitting diodes, comprising:
   a voltage source;
   a plurality of light emitting diodes coupled in series, wherein said voltage source is coupled to one end of said plurality of light emitting diodes;
   a plurality of switches, each of which is coupled in parallel with a corresponding light emitting diode in said plurality of light emitting diodes for individually controlling brightness of said corresponding light emitting diode;
   a plurality of PWM signals coupled to said plurality of switches, respectively, for individually controlling each of said plurality of switches; and
   a switch coupled in series with said plurality of light emitting diodes for controlling brightness of said plurality of light emitting diodes, wherein said switch is either on or off;
   wherein one of said plurality of PWM signals has a duty cycle ratio to modulate current through said corresponding light emitting diode, and wherein said current through said corresponding light emitting diode is modulated from 0 to a predetermined value.

2. The circuit as claimed in claim 1, further comprising:
   a low-dropout regulator,
   wherein said voltage source is coupled to said low-dropout regulator to generate a regulated voltage for supplying power to said plurality of light emitting diodes.

3. The circuit as claimed in claim 1, further comprising:
   a resistor coupled to said plurality of light emitting diodes in series.

4. A method for driving light emitting diodes, comprising:
   coupling a plurality of light emitting diodes in series;
   coupling a power source to one end of said plurality of light emitting diodes;
   coupling each of a plurality of switches in parallel with a corresponding light emitting diode in said plurality of light emitting diodes for individually controlling brightness of said corresponding light emitting diode;
   controlling a switch by a PWM signal, thereby controlling power delivered to said corresponding light emitting diode; and
   switching a control switch that is coupled to said plurality of light emitting diodes in series either on or off for controlling brightness of said plurality of light emitting diodes,
   wherein current through each of said plurality of light emitting diodes is modulated from 0 to a predetermined value.

5. The method as claimed in claim 4, further comprising:
   turning on said control switch to turn off said corresponding LED; and turning off said control switch to turn on said corresponding light emitting diode.

6. The method as claimed in claim 4, wherein said PWM signal has a duty cycle ratio to modulate current through said corresponding light emitting diode.

7. The method as claimed in claim 4, further comprising:
   regulating said power source to generate a regulated voltage,
   wherein said regulated voltage supplies power to said plurality of light emitting diodes.

8. A circuit for driving light emitting diodes, comprising:
   a voltage source;
   a first light emitting diode, wherein said voltage source is coupled to one end of said first light emitting diode;
   a first switch coupled in parallel with said first light emitting diode for controlling brightness of said first light emitting diode;
   a second light emitting diode coupled in series with said first light emitting diode;
   a second switch coupled in series with said first light emitting diode for controlling brightness of said first light emitting diode, wherein said second switch is switched either on or off;
   a third switch coupled in parallel with said second light emitting diode for controlling brightness of said second light emitting diode; and
   a low-dropout regulator coupled to said voltage source for generating a regulated voltage for supplying power to said first and said second light emitting diodes.

9. The circuit of claim 8, further comprising:
   a PWM signal coupled to said first switch for controlling said first switch.

10. The circuit of claim 8, further comprising: a resistor coupled to said first light emitting diode in series.

* * * * *